US012172293B2

(12) United States Patent
Schneider et al.

(10) Patent No.: US 12,172,293 B2
(45) Date of Patent: Dec. 24, 2024

(54) PLIERS STORAGE RACK

(71) Applicant: Milwaukee Electric Tool Corporation, Brookfield, WI (US)

(72) Inventors: Thomas J. Schneider, Milwaukee, WI (US); Logan C. Arlov, Cocoa Beach, FL (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 18/066,550

(22) Filed: Dec. 15, 2022

(65) Prior Publication Data

US 2023/0158660 A1 May 25, 2023

Related U.S. Application Data

(63) Continuation of application No. PCT/US2022/080255, filed on Nov. 21, 2022.

(Continued)

(51) Int. Cl.
*B25H 3/04* (2006.01)

(52) U.S. Cl.
CPC .................................... *B25H 3/04* (2013.01)

(58) Field of Classification Search
CPC .......... B25H 3/04; B25H 3/003; B25H 3/006; B25B 7/10; B25B 27/205

(Continued)

(56) References Cited

U.S. PATENT DOCUMENTS 2,577,988 A * 12/1951 Wirth .................... A47F 5/0876 211/70.6
2,974,804 A * 3/1961 Maro ........................ B25H 3/04 248/220.31

(Continued)

FOREIGN PATENT DOCUMENTS

CN 203282367 11/2013
CN 204053836 12/2014

(Continued)

OTHER PUBLICATIONS

Plyworx, <https://pliersrack.com/#elementor-action%3Aaction%3Dpopup%3Aopen%26settings%3DeyJpZC16IjE1MTciLCJ0b2dnbGUiOmZhbHNIf Q%3D%3D>, believed to be commercially available at least by Oct. 13, 2021, Retrieved on Dec. 14, 2022, 7 pages.

(Continued)

*Primary Examiner* — Patrick D Hawn
(74) *Attorney, Agent, or Firm* — Reinhart Boerner Van Deuren s.c.

(57) ABSTRACT

A storage rack for storing tools, such as pliers with open-biased handles, is provided. The pliers storage rack includes a support base and a plurality of pliers support structures coupled to the support base. Each of the plurality of pliers support structures define an open support region. A pair of pliers is supported by each of the plurality of pliers support structures. Each pair of pliers includes a pair of handles that are biased toward an open position and a pair of jaws opposite the pair of handles. The pair of handles engaged within the open support region in a position in which the pair of jaws of the pair of pliers extend out of a first end of the open support region and the pair of handles of the pair of pliers extend out of a second end of the open support region.

20 Claims, 5 Drawing Sheets

Related U.S. Application Data

(60) Provisional application No. 63/282,872, filed on Nov. 24, 2021.

(58) Field of Classification Search
USPC ........................................................ 211/70.6
See application file for complete search history.

(56) References Cited

U.S. PATENT DOCUMENTS

| | | | | | |
|---|---|---|---|---|---|
| 3,405,809 | A * | 10/1968 | Schatz | A47J 47/16 | 211/87.01 |
| 3,516,585 | A * | 6/1970 | Inwood | B25H 3/006 | 206/349 |
| 4,134,499 | A * | 1/1979 | Joswig | B25H 3/04 | 248/316.3 |
| 4,410,095 | A * | 10/1983 | Dembicks | A47F 5/08 | 248/225.11 |
| 4,681,233 | A * | 7/1987 | Roth | A47F 5/0823 | D6/567 |
| 5,007,313 | A | 4/1991 | Jeromson, Jr. et al. | | |
| 5,065,650 | A | 11/1991 | Anderson et al. | | |
| 5,174,177 | A | 12/1992 | Jeromson, Jr. et al. | | |
| 5,515,587 | A | 5/1996 | Pool | | |
| 5,553,717 | A * | 9/1996 | Minneman | A47B 81/005 | 206/315.11 |
| 5,826,467 | A | 10/1998 | Huang | | |
| 5,865,075 | A | 2/1999 | Medved | | |
| 6,401,923 | B1 | 6/2002 | Huang | | |
| 6,470,774 | B2 | 10/2002 | Chang | | |
| 6,564,949 | B1 * | 5/2003 | Saathoff | B25H 3/006 | 211/94.01 |
| 6,595,376 | B1 * | 7/2003 | Lin | A47L 13/512 | 211/89.01 |
| 6,769,553 | B1 * | 8/2004 | Hurt | A47F 7/0028 | 211/60.1 |
| 6,976,412 | B1 | 12/2005 | Yu | | |
| 7,032,479 | B1 | 4/2006 | Wang | | |
| 7,055,413 | B1 | 6/2006 | Wang | | |
| 7,194,936 | B2 | 3/2007 | Engel et al. | | |
| 7,503,459 | B2 * | 3/2009 | Grayson | A47F 7/0028 | 211/70.8 |
| 7,654,400 | B2 * | 2/2010 | Orr | B25H 3/04 | 211/70.6 |
| 7,669,723 | B2 * | 3/2010 | Kao | B25H 3/04 | 206/349 |
| 7,717,278 | B2 * | 5/2010 | Kao | B25H 3/04 | 206/349 |
| 7,753,216 | B2 * | 7/2010 | Kao | B25H 3/04 | 211/70.6 |
| 7,802,680 | B2 * | 9/2010 | Krebs | B25H 3/04 | 206/349 |
| 8,286,807 | B2 * | 10/2012 | Winnard | B25H 3/003 | 211/70.6 |
| 8,960,057 | B2 | 2/2015 | Zeng | | |
| 9,205,552 | B2 * | 12/2015 | Kao | F16M 13/022 | |
| 9,533,405 | B2 | 1/2017 | Chern | | |
| 9,597,792 | B1 * | 3/2017 | Kao | B25H 3/04 | |
| 9,656,385 | B1 * | 5/2017 | Kao | A47F 7/0035 | |
| 9,676,087 | B2 | 6/2017 | Yang | | |
| 9,827,663 | B2 * | 11/2017 | Kao | B25H 3/04 | |
| 9,925,657 | B1 * | 3/2018 | Kao | B25H 3/04 | |
| 9,962,827 | B2 * | 5/2018 | Kao | B25H 3/04 | |
| 10,022,857 | B2 * | 7/2018 | Kao | B25H 3/04 | |
| 10,040,189 | B2 * | 8/2018 | Kao | A47F 7/0028 | |
| 10,279,465 | B2 * | 5/2019 | Chang | A47F 5/0006 | |
| 10,421,178 | B2 | 9/2019 | Engel et al. | | |
| 2007/0210021 | A1 * | 9/2007 | Whitehead | B25H 3/04 | 211/70.6 |
| 2008/0264216 | A1 | 10/2008 | Duffy | | |
| 2010/0001159 | A1 | 1/2010 | Kao | | |
| 2011/0214538 | A1 | 9/2011 | Huang | | |
| 2013/0019720 | A1 | 1/2013 | Harrison et al. | | |
| 2016/0303721 | A1 | 10/2016 | Ludtke et al. | | |
| 2017/0312910 | A1 | 11/2017 | Kao | | |
| 2018/0147706 | A1 | 5/2018 | Murg et al. | | |
| 2018/0236653 | A1 * | 8/2018 | Kao | B25H 3/006 | |
| 2019/0059614 | A1 | 2/2019 | Wu et al. | | |
| 2020/0122315 | A1 | 4/2020 | Hurley | | |
| 2020/0171625 | A1 | 6/2020 | Dahlke et al. | | |

FOREIGN PATENT DOCUMENTS

| | | |
|---|---|---|
| DE | 29616737 | 12/1996 |
| DE | 29704470 | 6/1997 |

OTHER PUBLICATIONS

International Search Report and Written Opinion for International Application No. PCT/US2022/080255, dated Mar. 24, 2023, 10 pages.

* cited by examiner

PLIERS STORAGE RACK

CROSS-REFERENCE TO RELATED APPLICATIONS

This application is a continuation of International Application No. PCT/US2022/080255, filed Nov. 21, 2022, which claims the benefit of and priority to U.S. Provisional Application No. 63/282,872, filed Nov. 24, 2021, which are incorporated herein by reference in their entireties.

BACKGROUND OF THE INVENTION

The present invention relates generally to the field of tool storage racks. The present invention relates specifically to a storage rack for storing pliers, specifically pliers with handles that are biased toward an open position, such as snap ring pliers.

SUMMARY OF THE INVENTION

One embodiment of the invention relates to a pliers storage rack. The pliers storage rack includes a support base and a plurality of pliers support structures coupled to the support base. Each of the plurality of pliers support structures includes a first sidewall extending away from the support base and a second sidewall extending away from the support base at a location spaced apart from the first sidewall. Each of the plurality of pliers support structures includes an outer wall coupled to the first sidewall at a location spaced apart from the support base, and the outer wall has an inner surface facing toward the support base. The outer wall, the first sidewall and the second sidewall together define an open support region, and the open support region defines a first open end, a second open end opposite the first open end, and an open front section extending between the first open end and the second open end. The pliers storage rack includes a pair of pliers supported by each of the plurality of pliers support structures. Each pair of pliers includes a pair of handles that are biased toward an open position and a pair of jaws opposite the pair of handles. The pair of handles engaged between the inner surface of the outer wall and at least one opposing surface of the support structure within the open support region, such that the pair of pliers is secured within the open support region in a position in which the pair of jaws of the pair of pliers extend out of a first end of the open support region and the pair of handles of the pair of pliers extend out of a second end of the open support region.

Another embodiment of the invention relates to storage rack for storing pliers having handles that are biased toward an open position. The storage rack includes a support base, a first inner support wall coupled to the support base and a first side support wall coupled to the first inner support wall. The first side support wall extends in an outward direction away from the support base. The storage rack includes a first outer support wall including an inner surface, a first interior edge coupled to the first side support wall at a location spaced apart from the first inner support wall and a first exterior edge opposite the first interior edge. The first outer support wall is offset from the support base by a first offset distance such that a second open support region configured to receive a first pair of pliers is formed between the first outer support wall and the support base. The storage rack includes a second inner support wall coupled to the support base and a second side support wall coupled to the second inner support wall. The second side support wall extending in an outward direction away from the support base. The storage rack includes a second outer support wall. The second outer support wall includes a second interior edge coupled to the second side support wall at a location spaced apart from the second inner support wall, a second interior edge coupled to the support base, and a second exterior edge opposite the second interior edge. The second outer support wall is offset from the support base by a second offset distance such that a second open support region configured to receive a second pair of pliers is formed between the second outer support wall and the support base.

Another embodiment of the invention relates to storage rack for storing pairs of pliers having handles that are biased toward an open position. The storage rack includes a support base and a first support structure coupled to the support base. The first support structure defines a first open support region, and the first open support region defines a first open end, a second open end opposite the first open end, and an open front section extending between the first open end and the second open end. The storage rack includes a second support structure coupled to the support base. The second support structure defines a second open support region, and the second open support region defines a first open end, a second open end opposite the first open end, and an open front section extending between the first open end and the second open end. The storage rack includes a first pair of pliers having handles that are biased toward an open position supported within the first open support region. The storage rack includes a second pair of pliers having handles that are biased toward an open position supported within the second open support region.

Another embodiment of the invention relates to a storage rack for storing one or more pairs of pliers having handles that are biased toward an open position, such as pairs of snap ring pliers. In a specific embodiment, the storage rack has a support base. A first outer support wall is coupled to the support base. The first outer support wall is offset from the support base by a first offset distance and oriented at a first angle with respect to the support base. A second outer support wall is also coupled to the support base. The second outer support wall is offset from the support base by a second offset distance and oriented at a second angle with respect to the support base. The second outer support wall is spaced apart from the first outer support wall.

The first outer support wall and the second outer support wall each respectively have a first edge and a second edge that is opposite the first edge. The first edge of the first outer support wall is coupled to the support base, and a first gap is defined between the second edge of the first outer support wall and the support base. The first edge of the second outer support wall is coupled to the support base, and a second gap is defined between the second edge of the second outer support wall and the support base. The first outer support wall has a first interior surface. The second outer support wall has a second interior surface. The first and second interior surfaces each respectively include a plurality of gripping structures.

In certain specific embodiments, the plurality of gripping structures is a plurality of vertical ribs. In other specific embodiments, the first offset distance is different than the second offset distance and the first angle is different than the second angle. In other specific embodiments, the first offset distance is the same as the second offset distance and the first angle is the same as the second angle.

In another specific embodiment, a first upright slot is coupled to a support base. The first upright slot is substantially open in the axial direction. The first upright slot has a first slot perimeter in which a first upright gap is defined. The first upright gap is sized to allow placement and removal of a first pair of pliers. At least a portion of the interior of the first upright slot is ribbed. Additionally, a second upright slot is coupled to the support base. The second upright slot is substantially open in the axial direction. The second upright slot has a second slot perimeter in which a second upright gap is defined. The second upright gap is sized to allow placement and removal of a second pair of pliers. At least a portion of the interior of the second upright slot is ribbed.

In certain specific embodiments, the first upright slot partially abuts the second upright slot. In other specific embodiments, the first gap is sized to support a first pair of pliers having a first pliers size, and the second gap is sized to support a second pair of pliers having a second pliers size that is different from the first pliers size.

In another specific embodiment, the storage rack includes a support base. A first inner wall is coupled to the support base. A first sidewall and a second sidewall are coupled to opposite sides of the first inner wall and extend outwardly from the support base. A first outer wall is coupled to the first sidewall. Together, the first outer wall, first sidewall, first inner wall, and second sidewall define a first vertical slot. The outer vertical edge of the first outer wall is spaced apart from the outer vertical edge of the second sidewall, defining a vertical gap between the first outer wall and the second sidewall. An interior side of the outer wall includes a plurality of gripping structures. A second outer wall and a second inner wall are additionally coupled to the second sidewall. A third sidewall is coupled to the second inner wall, spaced apart from the second sidewall. The third sidewall extends outwardly from the support base. Together, the second outer wall, second sidewall, second inner wall, and third sidewall define a second vertical slot. The outer vertical edge of the second outer wall is spaced apart from the outer vertical edge of the third sidewall, defining a vertical gap between the second outer wall and the third sidewall. An interior side of the outer wall includes a plurality of gripping structures.

In certain specific embodiments the plurality of gripping structures include a plurality of ribs. In certain more specific embodiments, the plurality of ribs are vertical ribs. In other specific embodiments, the inner wall is curved.

Alternative exemplary embodiments relate to other features and combinations of features as may be generally recited.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
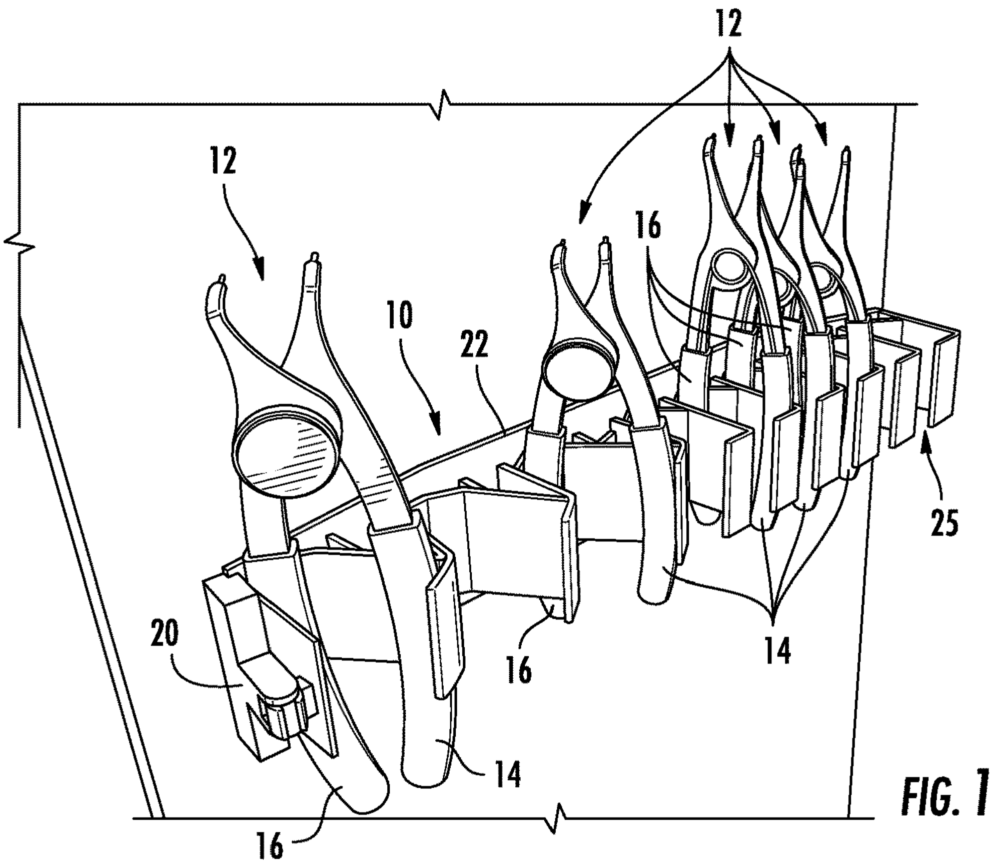
FIG. 1 is a perspective view of a storage rack storing various pairs of pliers, according to an exemplary embodiment.

Referring generally to the figures, various embodiments of a storage rack, storage tray, or storage holster for storing tools, such as pairs of pliers, are shown. In various embodiments, the storage racks shown herein are specifically configured to store pliers that have handles biased toward an open position, such as the spring-biased handles of a snap ring pliers.

Typical pliers trays or racks use support floors to support a stored pair of pliers from underneath and, thus, prevent the pliers from dropping to the ground. Some standard pliers trays or racks include slots to support individual pairs of pliers, each slot having a perimeter that surrounds the pliers (i.e. does not have gaps sufficient for the pliers to pass through) to keep the stored pliers from falling forward or sideways out of the respective slot and, likewise, out of the tray or rack.

As discussed herein, Applicant has designed storage racks that allow a user to access a stored pair of pliers from above, below, or in front of the storage rack. The storage rack includes an outer support wall offset from a vertical support base and oriented at an angle with respect to the vertical support base. The offset distance and orientation angle are, together, sufficient to establish a friction fit with a pair of spring-biased pliers handles interested between the outer wall and the support base. The bias of the pliers handles towards the open position facilitates the friction fit. The friction fit is sufficient to hold the pliers in place and prevent the pliers from dropping or tilting out of position within the rack. Applicant has also found that providing gripping structures, such as a plurality of vertical ribs, to the interior of the outer support wall (i.e., facing the inserted pliers handle) may improve the friction fit between the outer support wall and the pliers handle.

Further, the designs discussed herein support pliers without the need for a support floor to support the pliers from below. In addition, the designs discussed herein support pliers without use of a complete, i.e. closed, support wall perimeter that surrounds the pliers. Thus, Applicant's designs allow a stored pair of pliers to protrude axially both above and below the portion of the storage rack gripping the pliers handles. This allows the user to grip the pliers either from above or below improving access to the pliers while supported. Further, as the friction fit of the pliers within the storage rack further prevents forward or sideways tilting, a gap sufficiently sized for the stored pair of pliers to pass through may be formed in the outer perimeter of the slot without detrimentally impacting the securement of the pliers within the storage rack. Therefore, if space is tight both in the areas above and below the pliers rack, a user can grip and remove the pliers from the front of the rack.

Referring to the figures, FIGS. 1-4 shows a perspective view of a storage rack, tray, or holster 10 for storing one or more pairs of pliers 12 with handles that are biased toward an open position. In the specific embodiment shown, the pliers 12 supported in rack 10 are snap ring pliers. In the orientation shown in FIGS. 1-4, the storage rack 10 has a generally vertical orientation, in that it is mounted to a generally vertical surface (e.g., such as a wall). In this arrangement, the pliers support structures (described in more detail below) of storage rack 10 are configured such that pliers 12 are supported with the jaws in vertical alignment with the handles, i.e. generally with jaws facing upward and handles facing downward or with jaws facing downward and handles facing upward. As will be understood, storage rack 10 maybe be mounted in other spatial orientations or on non-vertical surfaces, and the positional terms vertical and horizontal reference the mounting orientation shown in FIGS. 1-4. In specific embodiments, storage rack 10 is magnetically mounted to the mounting surface.

The pliers 12 each have a first handle 14 and a second handle 16 that are biased toward an open position. Specifically, first handle 14 and second handle 16 are biased away from one another, such that when first handle 14 and second handle 16 are compressed toward one another, first handle 14 and second handle 16 each respectively apply an outward bias force against the compressing structure. In specific embodiments, first handle 14 and second handle 16 are spring-biased open.

Figure 2:
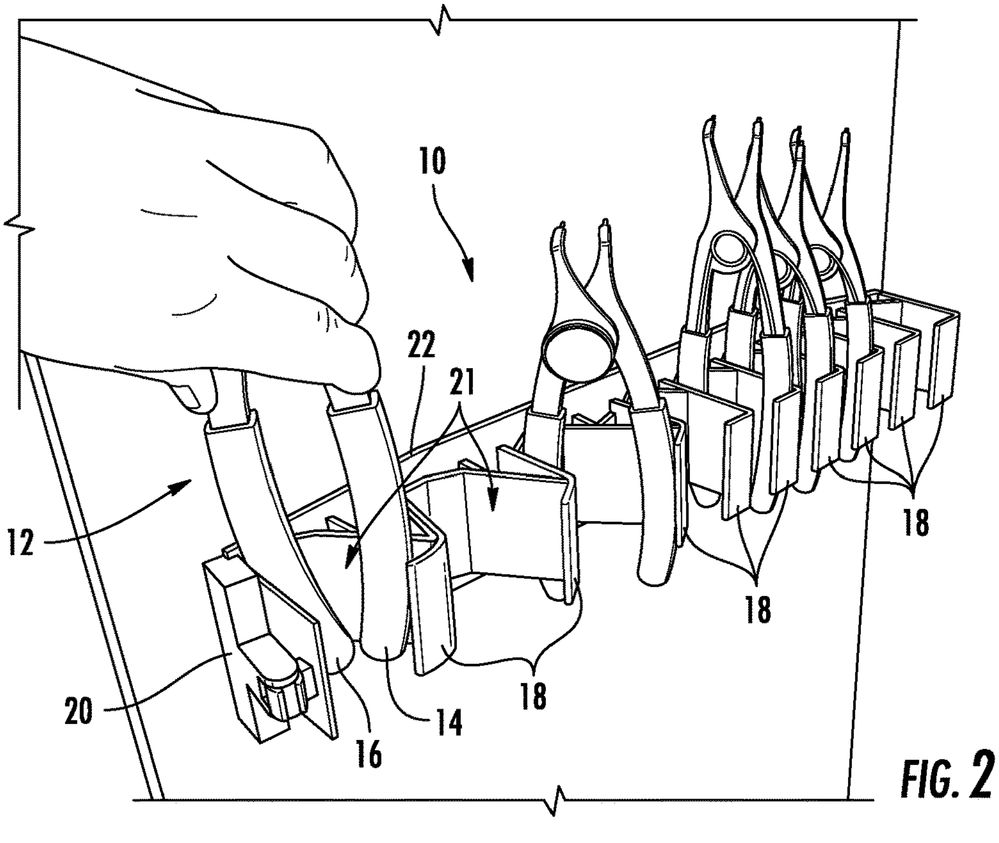
FIG. 2 is a perspective view of the storage rack shown in FIG. 1, showing a user removing a pair of pliers from above the rack, according to an exemplary embodiment.
Figure 3:
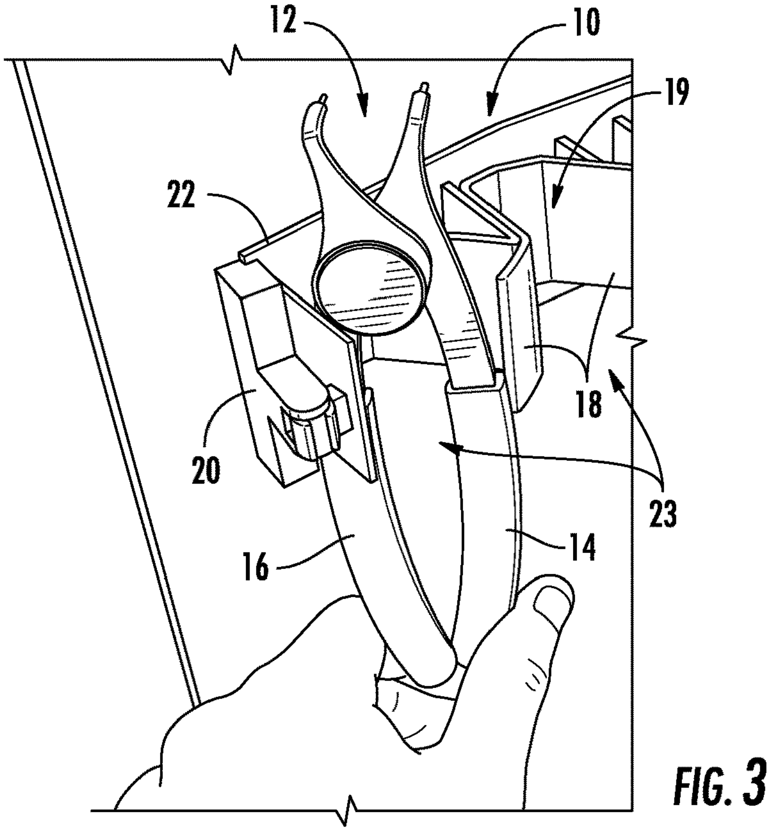
FIG. 3 is a perspective view of a portion of the storage rack shown in FIG. 1, showing a user removing a pair of pliers from below the rack, according to an exemplary embodiment.
Figure 4:
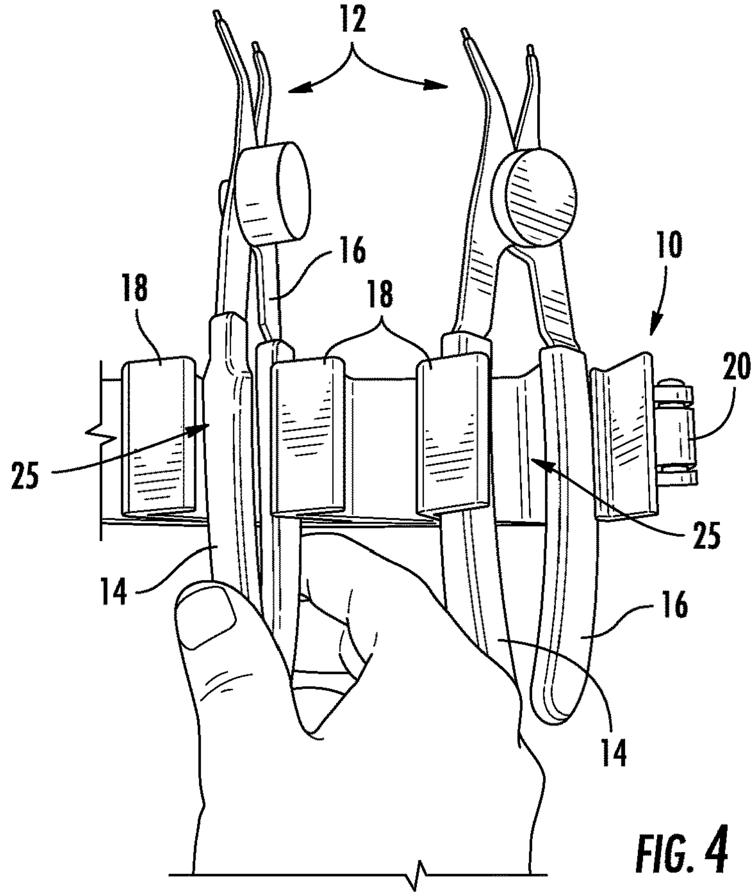
FIG. 4 is a perspective view of a portion of the storage rack shown in FIG. 1, showing a user removing a pair of pliers from the front of the rack, according to another exemplary embodiment.

FIGS. 2-4 show a pair of pliers 12 being removed from storage rack 10 by a user. Storage rack 10 includes a plurality of open support regions, shown as upright slots 19, that are defined between respective walls of each support structures 18. As shown, each support structure 18 are coupled to a support base 22.

To insert pliers 12 into a given slot 19, first handle 14 and second handle 16 are at least partially compressed (specifically, drawn toward one another), and then released once positioned within slot 19. Each slot 19 is sized to prevent first handle 14 and second handle 16 of a pair of pliers 12 of a predetermined pliers size from separating sufficiently to achieve a neutral position (specifically, first handle 14 and second handle 16 remain at least partially compressed toward one another within slot 19 after the user's grip is released). Thus, when first handle 14 and second handle 16 are released within slot 19, first handle 14 and second handle 16 press against support structure 18, applying an outward bias force against the portions of support structure 18 that respectively engage first handle 14 and second handle 16. This outward bias force generates a friction fit that secures pliers 12 in place and prevents pliers 12 from dropping or tilting within or out of storage rack 10.

As shown in FIG. 2, storage rack 10 is configured to allow the user to grip an upper portion of pliers 12 from above storage rack 10 and lift pliers 12 upward and out of storage rack 10 through an open first end, shown as upper end 21. As shown in FIG. 3, storage rack 10 is configured to allow the user to grip a lower portion of pliers 12 and pull pliers 12 downward and out of storage rack 10 through an open first end, shown as lower end 23. By providing access to pliers 12 from both above and below, storage rack 10 provides improved access to pliers 12, when there is, for example, another rack, shelf, holster, or other form of barrier positioned above storage rack 10.

As shown in FIG. 4, storage rack 10 is also configured to allow the user to grip a lower portion of pliers 12 from in front of storage rack 10 and to remove pliers 12 by pulling the pliers forward out of storage rack 10 through an open front section, shown as front opening 25. By providing access to pliers 12 from the front, storage rack 10 provides improved access to pliers 12, when there is, for example, another rack, shelf, holster, or other form of barrier positioned both above and below storage rack 10. As shown in FIG. 4, front opening 25, is defined between opposing edges/walls of support structure 18 and is sufficient to allow passage of pliers 12. As the friction fit between the first and second handles 14, 16 and support structure 18 prevents pliers 12 from substantially tilting within support structure 18, front opening 25 does not impede the securement of pliers 12 by support structure 18.

In the embodiment shown in FIGS. 1-4, storage rack 10 includes a collapsible handle 20. As shown in FIG. 4, storage rack 10 is mounted in a position rotated 180 degrees from the position in which storage rack 10 is mounted in FIGS. 1-3. This allows storage rack 10 to be mounted with handle 20 protruding to the left (as shown in FIGS. 1-3), or to the right (as shown in FIG. 4), to meet the spacing demands of a given mounting location. For example, if there is a barrier element to either the left or the right of storage rack 10 in the desired mounting location, it may be convenient to mount storage rack 10 in an orientation that positions handle 20 away from the barrier element. Storage rack 10 may be mounted in either configuration without impact to the functions described above.

Figure 5:
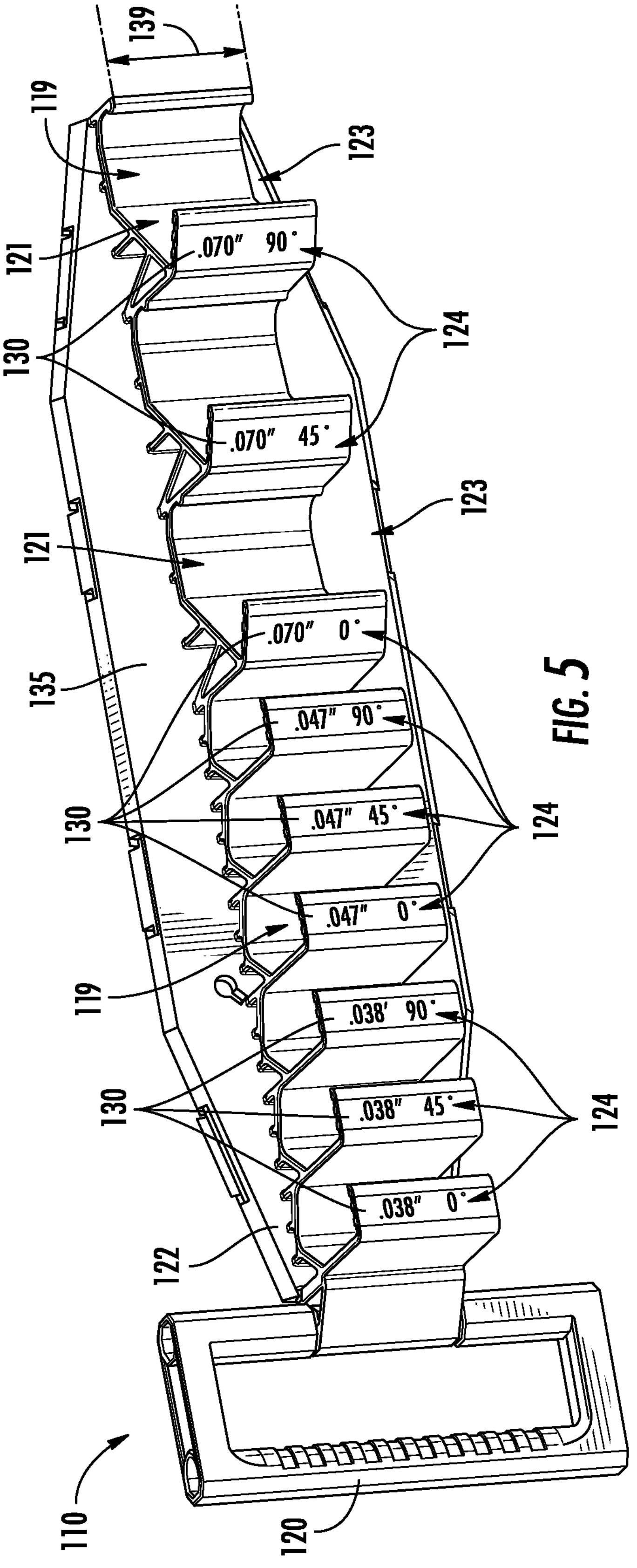
FIG. 5 is a front perspective view of a storage rack for storing pairs of pliers, according to another exemplary embodiment.
Figure 6:
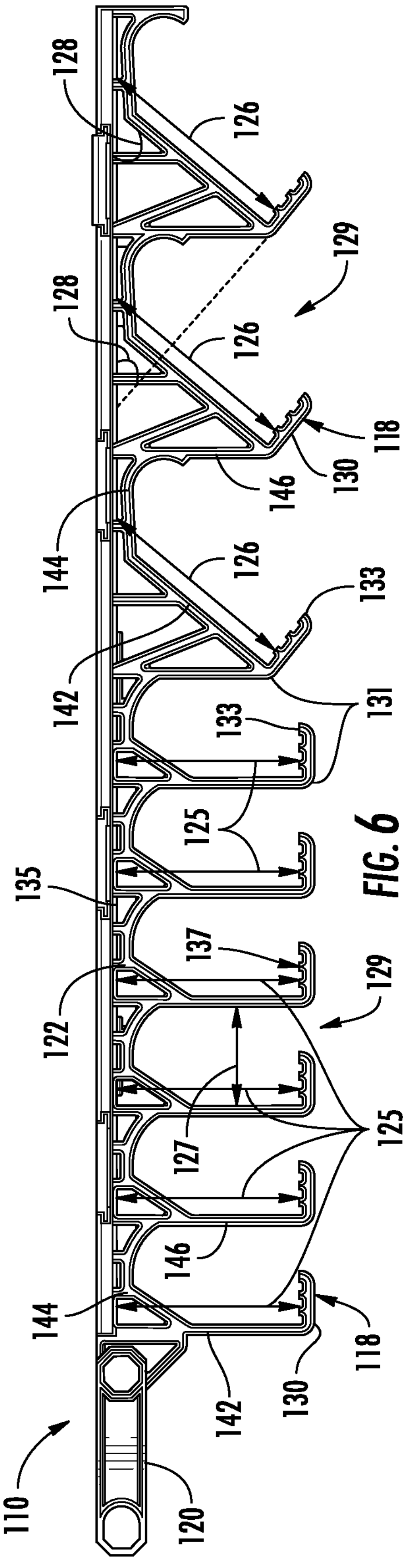
FIG. 6 is a top view of the storage rack shown in FIG. 5, according to an exemplary embodiment.

FIGS. 5-10 show various views of a storage rack 110, according to an exemplary embodiment. Storage rack 110 is substantially the same as storage rack 10 except for the differences described herein. Referring to FIGS. 5-6, a plurality of pliers support structures, shown as support structures 118, are coupled to a support base 122. Each support structure 118 includes a plurality of walls, and the inner surfaces of each define open support regions, shown as slots 119. Each support structure 118 includes an outer wall, shown as outer support wall 130. Each outer support wall 130 has an interior edge 131, an exterior edge 133 opposite interior edge 131 and an inner surface 137. Additionally, each outer support wall 130 is offset from support base 122 by an offset distance 125 or 126.

Within storage rack 10, certain outer walls 130 are offset by the same offset distance and oriented at the same angle with respect to support base 122, while other outer walls 130 are offset by different offset distances, such as offset distance 125 and offset distance 126, and oriented at different offset angles with respect to support base 122. As shown in FIG. 6, offset distances 125 and 126 are the distances measured from outer surface 135 of support base 122 perpendicular to inner surfaces 137 of outer walls 130 As shown in FIG. 6, offset distance 125 is smaller than offset distance 126.

In various embodiments, each support structure 118 is laterally spaced from the adjacent support structure by a distance generally shown as width 127. As shown, width 127 is measured between opposing surfaces of each support structure 118 perpendicular to offset distance 125 and parallel to support base 122. In addition, each support structure 118 has a height 139.

In various embodiments, offset distances 125 and 126, height 139 and width 127 are such that support structures 118 are specifically sized to support pliers and specifically sized to support pliers with outwardly biased handles.

In various embodiments, outer walls 130 are oriented at different offset angles relative to support base 122. In some embodiments, some outer walls 130 are oriented substantially parallel to support base 122, while other outer walls 130 are angled at a non-zero angle 128 with respect to support base 122. The angle 128 shown in this embodiment is 45 degrees. Adjusting the offset distance and orientation angle of a given outer wall 130 allows pliers of different sizes to be accommodated by differently sized support structures 118 within storage rack 110. In specific embodiments, indicators 124 are located on an exterior surface of each outer wall 130 to indicate to a user the recommended pliers to be supported by a given outer wall 130.

In specific embodiments, support structure 118 is formed by a plurality of support walls, such as outer support wall 130 described above, as well as a first sidewall or side support wall 142, an inner wall or inner support wall 144, and second sidewall or side support wall 146, together defining slot 119. In certain specific embodiments, inner wall 144 is coupled to support base 122, first sidewall 142 is coupled to inner wall 144, and outer support wall 130 is coupled to first sidewall 142 at a location spaced apart from inner wall 144, specifically opposite first sidewall 142. Additionally, second sidewall 146 is coupled to inner wall 144 at a location spaced apart from first sidewall 142. First sidewall 142 and second sidewall 146 each extend in an outward direction away from support base 122. In specific embodiments, outer wall 130 is coupled to first sidewall 142 at interior edge 131 of outer wall 130, such that an open front section 129, configured to receive a pair of pliers, is defined between exterior edge 133 of outer wall 130 and the second sidewall 146. Specifically, open front section 129 generates a break in the perimeter of support structure 118 between outer wall 130 and second sidewall 146. Further, each outer support wall 130 is oriented at a designated angle with respect to support base 122 such that the handles of the pair of pliers are supported between outer support wall 130 and support base 122 when the pair of pliers is stored in storage rack 110.

In specific embodiments, inner wall 144 includes a non-planar section that facilitates engagement with the pliers handles. In the embodiment shown inner wall 144 is curved. In other specific embodiments, inner wall 144 is angled. In some instances, two support structures 118 may abut one another such that a portion of support structure 118 may serve as a first side support wall 142 for one support structure 118 and as a second side support wall 146 for an adjoining support structure 118. In some instances, first sidewall 142 is substantially perpendicular to support base 122, and in other instances, first sidewall 142 is angled with respect to support base 122 by angle 128.

Each slot 119 is open in the axial direction defining first open end 121 and second open end 123. In other words, as shown in FIG. 5 there is no structure of storage rack 110 positioned above or below slot 119 in the axial direction that prohibits the pliers from being axially positioned in or removed from slot 119. As such, support structure 118 allows through passage of the pair of pliers in a vertical direction. Further, open front section 129, described above, is configured to horizontally receive a pair of pliers to be stored within slot 119 and to allow horizontal through passage of the pair of pliers out of slot 119 when the pair of pliers is disengaged from support structure 118. As shown in FIGS. 5-10, open front section 129 is substantially upright and extends the full height of support structure 118. In this embodiment, no portion of support structure 118 protrudes above or below open front section 129.

As shown in FIGS. 5 and 6, multiple support structures 118 are arranged along the length of support base 122. In this arrangement, an axis of each slot 119 extending between open ends 121 and 123 is perpendicular to a longitudinal axis of support base 122.

Figure 7:
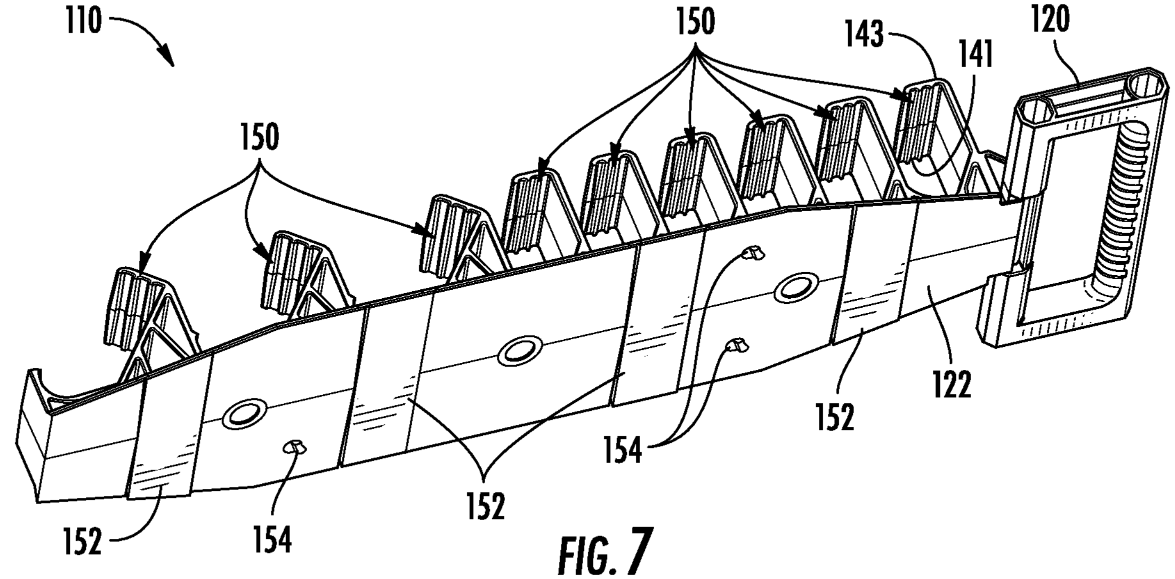
FIG. 7 is a rear perspective view of the storage rack shown in FIG. 5, according to an exemplary embodiment.

Referring to FIG. 7, the interior surface of each slot 119 includes one or more gripping structures that strengthen the friction fit between the pliers handle and outer wall 130 when a pliers is positioned within slot 119. In this embodiment, the gripping structures are a plurality of ribs 150 formed into the interior surface, specifically the surface facing toward the support base 122, of outer wall 130. In general, ribs 150 extend in a direction between lower edge 141 and upper edge 143 of each outer wall 130. Ribs 150 support the handles of the pair of pliers, such that the pair of pliers is secured within slot 119.

Additionally, a collapsible handle 120 is coupled to support base 122. To allow temporary mounting of storage rack 110 to a magnetic surface, magnets 152 are coupled to the rear of support base 122. This allows a user to mount storage rack 110 at a given location upon arrival at a particular work site, and then to readily dismount storage rack 110 and move it to a new location at a new work site. When more permanent mounting of storage rack 110 is desired, mounting holes 154 are formed in storage rack 110 through which fasteners may be applied to secure storage rack 110 more fixedly to a wall or other mounting surface. Mounting holes 154 can also be seen more clearly in FIG. 10.

Figure 8:
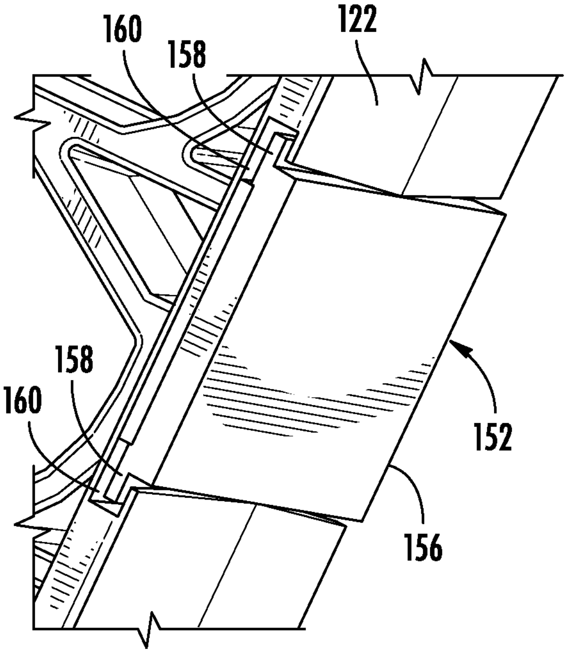
FIG. 8 is a detailed rear perspective view from above of a portion of the storage rack of FIG. 5, showing a magnet coupled to the rear of the storage rack, according to an exemplary embodiment.
Figure 9:
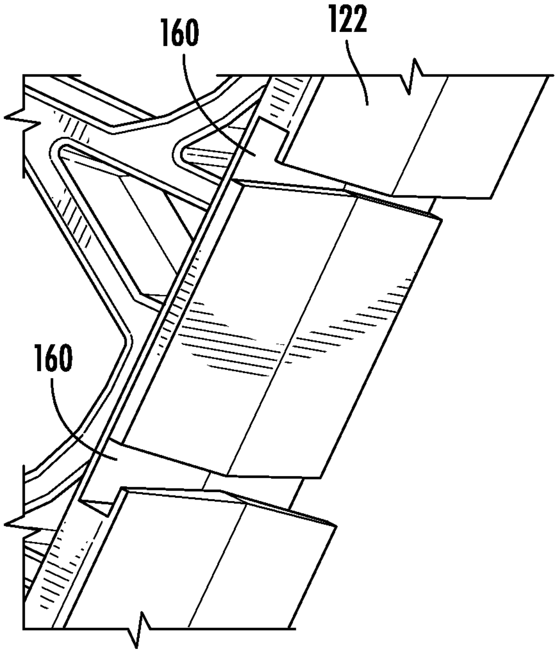
FIG. 9 is a detailed rear perspective view from above of a portion of the storage rack of FIG. 5, showing the magnet removed from the storage rack, according to an exemplary embodiment.

Referring to FIG. 8, one of the magnets 152 is shown in greater detail. In this embodiment, magnet 152 is slidably coupled to support base 122. Magnet 152 has a body 156 and flanges 158 protruding from opposite sides of body 156. Body 156 has a first depth, and flanges 158 have a second depth that is narrower than the first depth. Flanges 158 are sized to slidably couple to channels 160 formed in support base 122. Referring to FIG. 9, channels 160 can be seen in greater detail, with magnet 152 removed.

Figure 10:
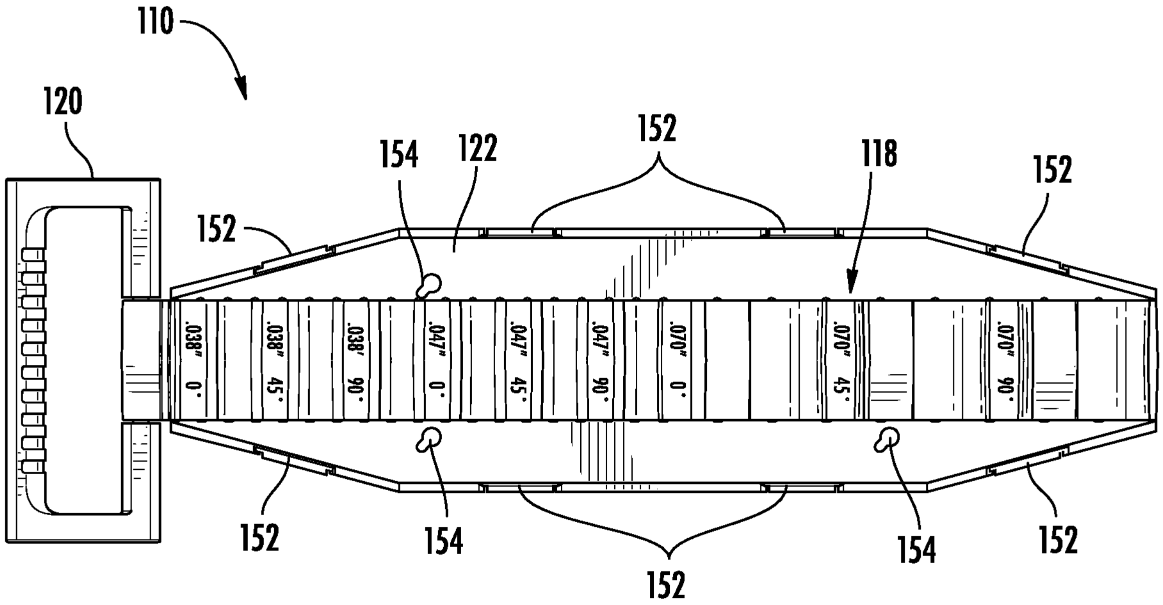
FIG. 10 is a front view of the storage rack shown in FIG. 5, according to an exemplary embodiment.

Referring to FIG. 10, a front view of storage rack 110 is shown. Like storage rack 10, storage rack 110 is substantially symmetric about the horizontal axis. Also like storage rack 10, storage rack 110 can be mounted in the position shown in FIG. 10, or in a rotated orientation, such as an orientation rotated 180 degrees from the orientation shown in FIG. 10.

Figure 11:
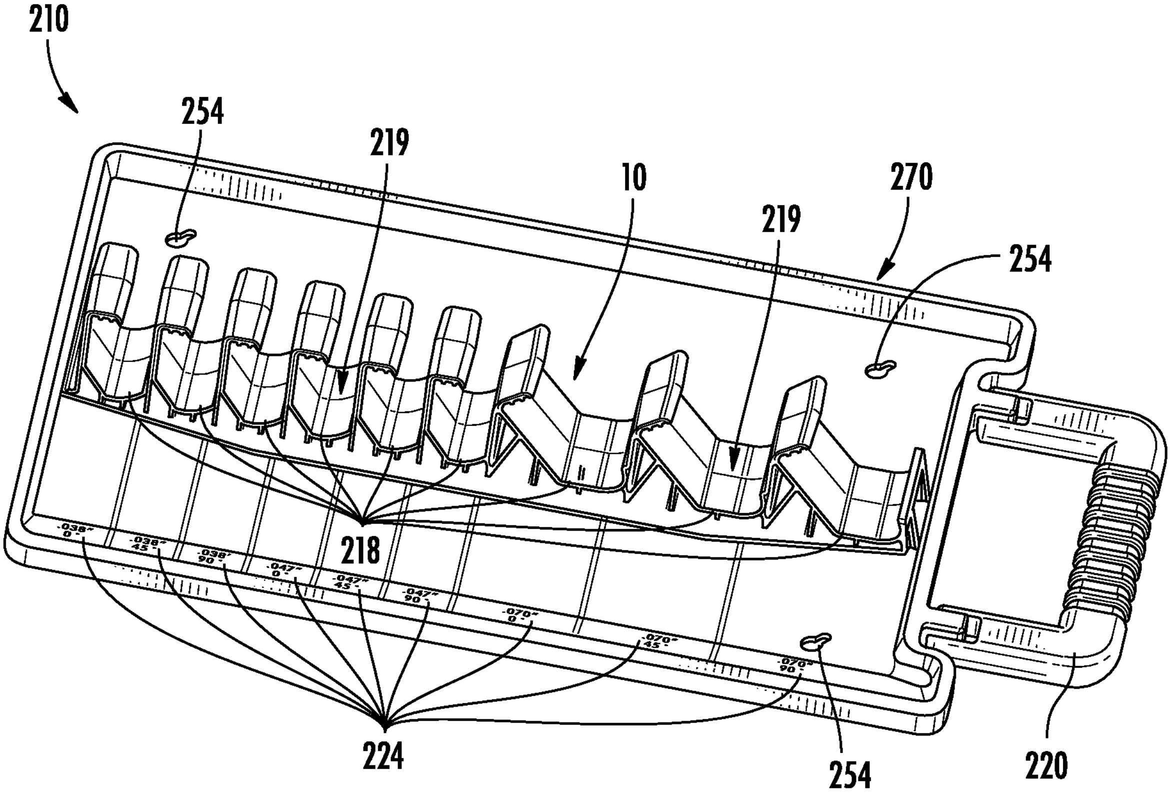
FIG. 11 is a front perspective view of a storage rack for storing pairs of pliers, according to another exemplary embodiment.

FIG. 11 shows a perspective view of a storage rack assembly 210. Storage rack 210 is assembled by coupling storage rack 10 to a support tray 270. In specific embodiments, collapsible handle 20 is readily removable and is removed before coupling storage rack 10 to support tray 270. In certain embodiments, storage rack 10 is readily removable from support tray 270, for instance, when a smaller footprint is available for mounting. However, when it is time to transport storage rack 10 to a new location, the additional support of storage tray 270 may prevent stored pairs of pliers within storage rack 10 from being jostled out of storage rack 10, for example, when storage rack 10 is placed into a tool bag or tool box or onto the seat of a vehicle. Support tray 270 includes mounting holes 254 for more fixedly mounting support tray 270 to a mounting surface, if desired. Additionally, a handle 220 is coupled to support tray 270 for convenient transportation of storage rack 210. In specific embodiments, handle 220 is collapsible. Further, indicators 224 that indicate the recommended pliers to position in a given slot 219 are applied to support tray 270 and aligned with each respective slot 219.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. In addition, as used herein, the article "a" is intended to include one or more component or element and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements or components of any of the other embodiments discussed above.

What is claimed is:

1. A pliers storage rack comprising:

a support base;

a plurality of pliers support structures coupled to the support base, each of the plurality of pliers support structures comprising:

an inner support wall coupled to the support base;

a first sidewall extending away from the support base;

a second opposing sidewall coupled to and in direct contact with the inner support wall at a location spaced apart from the first sidewall, the second opposing sidewall extending in an outward direction away from the support base; and an outer wall coupled to the first sidewall at a location spaced apart from the support base and spaced apart from the second opposing sidewall, the outer wall having an inner surface facing toward the support base;

wherein that outer wall, the first sidewall and the second sidewall together define an open support region, the open support region defining a first open end, a second open end opposite the first open end, and an open front section extending between the first open end and the second open end; and a pair of pliers supported by each of the plurality of pliers support structures, each pair of pliers including a pair of handles that are biased toward an open position and a pair of jaws opposite the pair of handles, the pair of handles engaged between the inner surface of the outer wall and at least one opposing surface of the support structure within the open support region, such that the pair of pliers is secured within the open support region in a position in which the pair of jaws of the pair of pliers extend out of a first end of the open support region and the pair of handles of the pair of pliers extend out of a second end of the open support region.

2. The pliers storage rack of claim 1, wherein the pair of handles is engaged between the inner surface of the outer wall and an-outer surface of the inner support wall.

3. The pliers storage rack of claim 1, wherein each of the plurality of pliers support structures further comprises a plurality of gripping structures coupled to an interior side of the support structure that engage at least one handle of the pair of handles to improve engagement between the pair of handles and the support structure.

4. The pliers storage rack of claim 3, wherein the plurality of gripping structures are a plurality of vertical ribs extending from the inner surface of the outer wall.

5. The pliers storage rack of claim 1, wherein the open front section of the open support region of each of the support structures is configured to allow removal of the pair of pliers out of the support structure and through the open front section.

6. The pliers storage rack of claim 1, wherein the inner surface of the outer wall of each of the support structures is parallel to the support base.

7. The pliers storage rack of claim 1, wherein the inner surface of the outer wall of each of the support structures is oriented at a 45 degree angle with respect to the support base.

8. A storage rack for storing pliers having handles that are biased toward an open position, the storage rack comprising:

a support base;

a first inner support wall coupled to the support base;

a first side support wall coupled to and in direct contact with the first inner support wall, the first side support wall extending in an outward direction away from the support base;

a first opposing side support wall coupled to and in direct contact with the first inner support wall at a location spaced apart from the first side support wall, the first opposing side support wall extending from the first inner support wall in an outward direction away from the support base;

a first outer support wall spaced apart from the first opposing side support wall, the first outer support wall comprising:

a first inner surface that faces toward the support base;

a first interior edge coupled to the first side support wall at a location spaced apart from the first inner support wall, and a first exterior edge opposite the first interior edge, wherein the first outer support wall is offset from the support base by a first offset distance such that a first open support region configured to receive a first pair of pliers is formed between the first outer support wall and the support base, and a second inner support wall coupled to the support base;

a second side support wall coupled to and in direct contact with the second inner support wall, the second side support wall extending in an outward direction away from the support base;

a second opposing side support wall coupled to and in direct contact with the second inner support wall at a location spaced apart from the second side support wall, the second opposing side support wall extending from the second inner support wall in an outward direction away from the support base; and a second outer support wall spaced apart from the second opposing side support wall, the second outer support wall comprising:

a second interior edge coupled to the second side support wall at a location spaced apart from the second inner support wall, a second inner surface that faces toward the support base; and a second exterior edge opposite the second interior edge, wherein the second outer support wall is offset from the support base by a second offset distance such that a second open support region configured to receive a second pair of pliers is formed between the second outer support wall and the support base.

9. The storage rack of claim 8, further comprising a plurality of gripping structures protruding from the first outer support wall in a direction toward the support base.

10. The storage rack of claim 9, wherein the plurality of gripping structures comprises ribs extending in a direction from a lower edge to an upper edge of each outer support wall.

11. The storage rack of claim 8, wherein the first offset distance is different than the second offset distance.

12. The storage rack of claim 11, wherein the first offset distance is smaller than the second offset distance.

13. The storage rack of claim 8, wherein the first outer support wall is perpendicular to the first side support wall.

14. The storage rack of claim 13, wherein the second outer support wall extends from the second side support wall such that a 45 degree angle is formed relative to the support base.

15. A storage rack for storing pairs of pliers having handles that are biased toward an open position, the storage rack comprising:

a support base;

a first support structure coupled to the support base, the first support structure defining a first open support region, the first open support region defining a first open end, a second open end opposite the first open end, and an open front section extending between the first open end and the second open end; and a second support structure coupled to the support base, the second support structure defining a second open support region, the second open support region defining a first open end, a second open end opposite the first open end, and an open front section extending between the first open end and the second open end;

a first pair of pliers having a first pair of handles that are biased toward an open position, each of the handles of the first pair of handles being supported within the first open support region; and a second pair of pliers having a second pair of handles that are biased toward an open position, each of the handles of the second pair of handles being supported within the second open support region;

wherein the first support structure comprises:

an inner support wall coupled to the support base;

a side support wall coupled to and in direct contact with the inner support wall, the side support wall extending in an outward direction away from the support base;

an opposing side support wall coupled to and in direct contact with the inner support wall at a location spaced apart from the side support wall, the opposing side support wall extending from the inner support wall in an outward direction away from the support base; and an outer support wall spaced apart from the opposing side support wall.

16. The storage rack of claim 15, wherein the first support structure and the second support structure both comprise a plurality of support walls, and wherein the first support structure abuts the second support structure.

17. The storage rack of claim 16, wherein at least one of the plurality of support walls is shared between the first support structure and the second support structure.

18. The storage rack of claim 15, wherein both the first and second support structures include a plurality of ribs located within the first and second open support regions.

19. The storage rack of claim 15, wherein the first and second open ends of the first and second open support regions define planes that are perpendicular to the support base.

20. The storage rack of claim 19, wherein the open front section of the first support structure is perpendicular to the first and second open ends of the first support structure.

* * * * *